United States Patent [19]

Gila et al.

[11] Patent Number: 5,731,762
[45] Date of Patent: Mar. 24, 1998

[54] DATA MEDIUM FOR IDENTIFYING OBJECTS, SCANNING DEVICE FOR INTERROGATION OF THE DATA MEDIUM AND PROCESS FOR CONTROLLING THE DATA MEDIUM

[75] Inventors: Janos Gila; Günther Hraby; Peter-Ernst Veith, all of Vienna; Martin Schiefer, Lilienfeld; Karl Asperger, Vienna, all of Austria

[73] Assignee: Siemens AG Austria, Vienna, Austria

[21] Appl. No.: 664,993

[22] Filed: Jun. 10, 1996

Related U.S. Application Data

[63] Continuation of PCT/EP94/04063, Dec. 6, 1994 published as WO95/16214, Jun. 15, 1995.

[30] Foreign Application Priority Data

Dec. 10, 1993 [AT] Austria ................ 2493/93
Dec. 10, 1993 [AT] Austria ................ 2494/93

[51] Int. Cl.⁶ .............. H04Q 1/00; H04B 7/00; G08B 13/14
[52] U.S. Cl. .............. 340/825.54; 340/825.49; 340/505; 340/568; 340/572; 343/767

[58] Field of Search ............ 340/825.54, 825.49, 340/568, 505, 572; 343/767, 768, 769

[56] References Cited

U.S. PATENT DOCUMENTS

| 4,068,232 | 1/1978 | Meyers et al. | 343/6.8 R |
| 5,118,904 | 6/1992 | Nguyenngoc | 174/35 GC |
| 5,432,518 | 7/1995 | Van Erven | 342/42 |

*Primary Examiner*—Michael Horabik
*Assistant Examiner*—Yonel Beaulieu
*Attorney, Agent, or Firm*—Herbert L. Lerner; Laurence A. Greenberg

[57] ABSTRACT

A data medium for identifying objects, in particular gas cylinders, includes a data source and an energy source. Each data medium contains at least one RF signal reflector having a characteristic frequency which can be controlled by the data source. The waveform of the characteristic frequency containing the individual identification of the data medium is in coded form. A scanning device for interrogation of the data medium and a process for controlling the data medium are also provided.

15 Claims, 4 Drawing Sheets

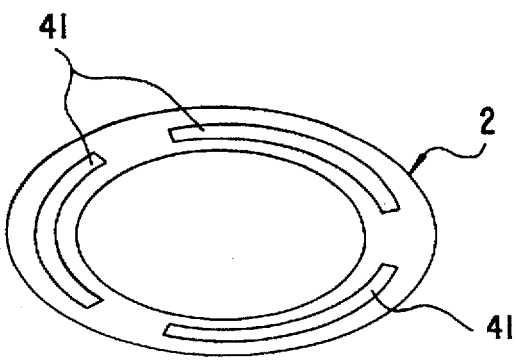
FIG.5
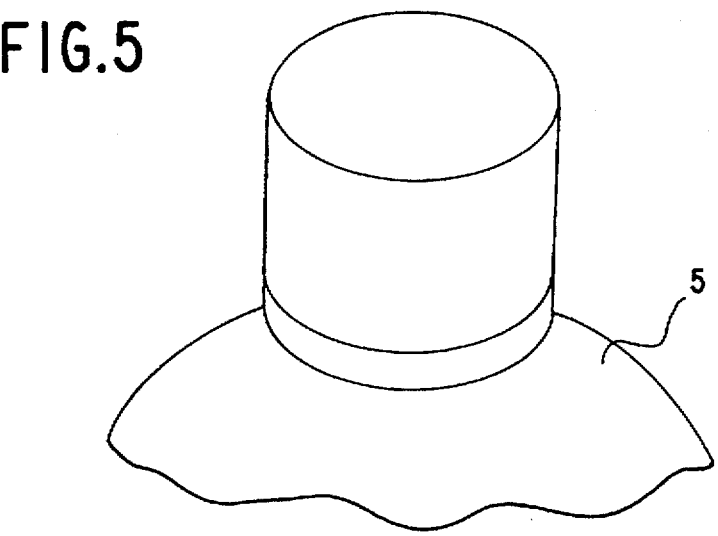
FIG.6
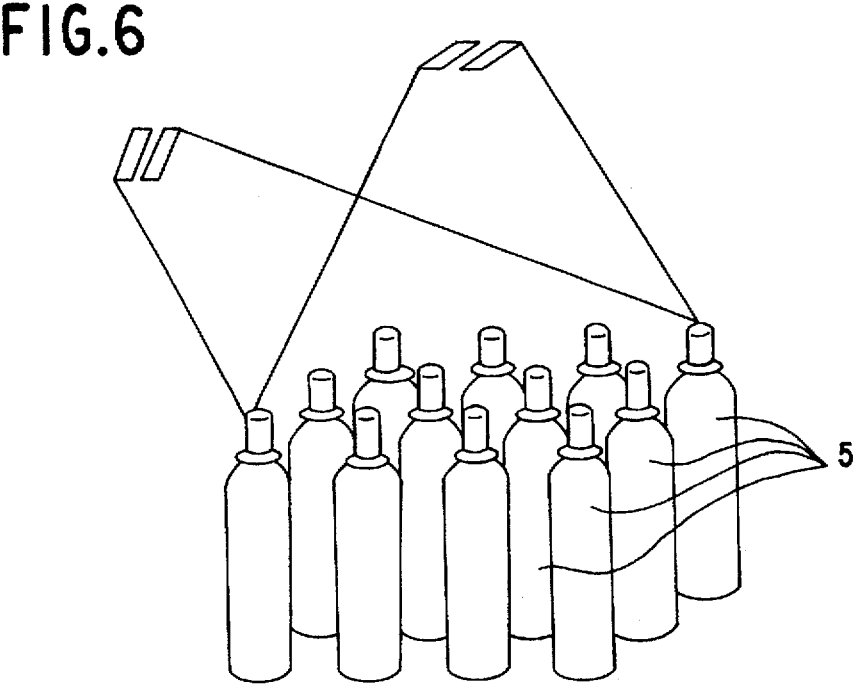

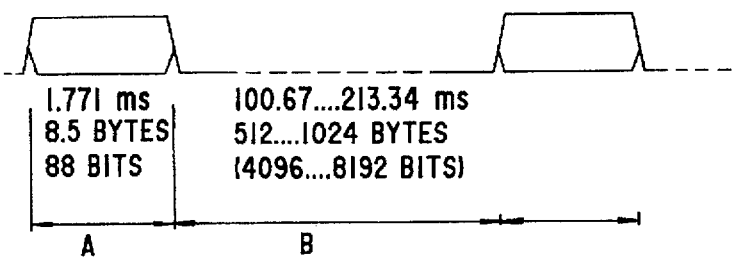
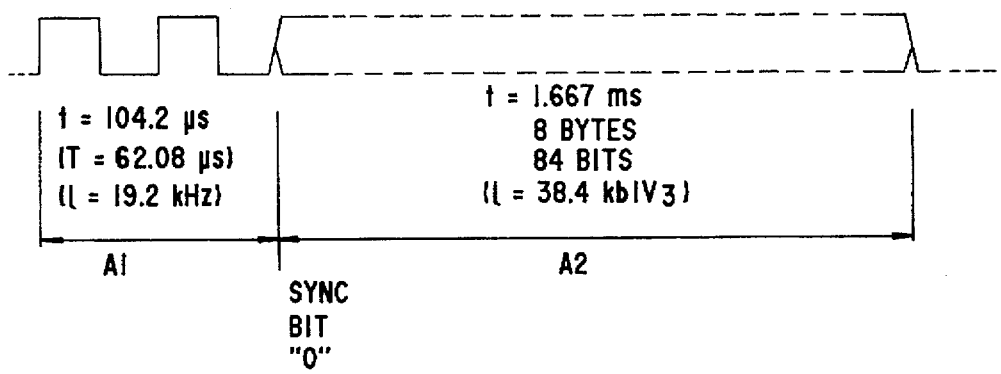
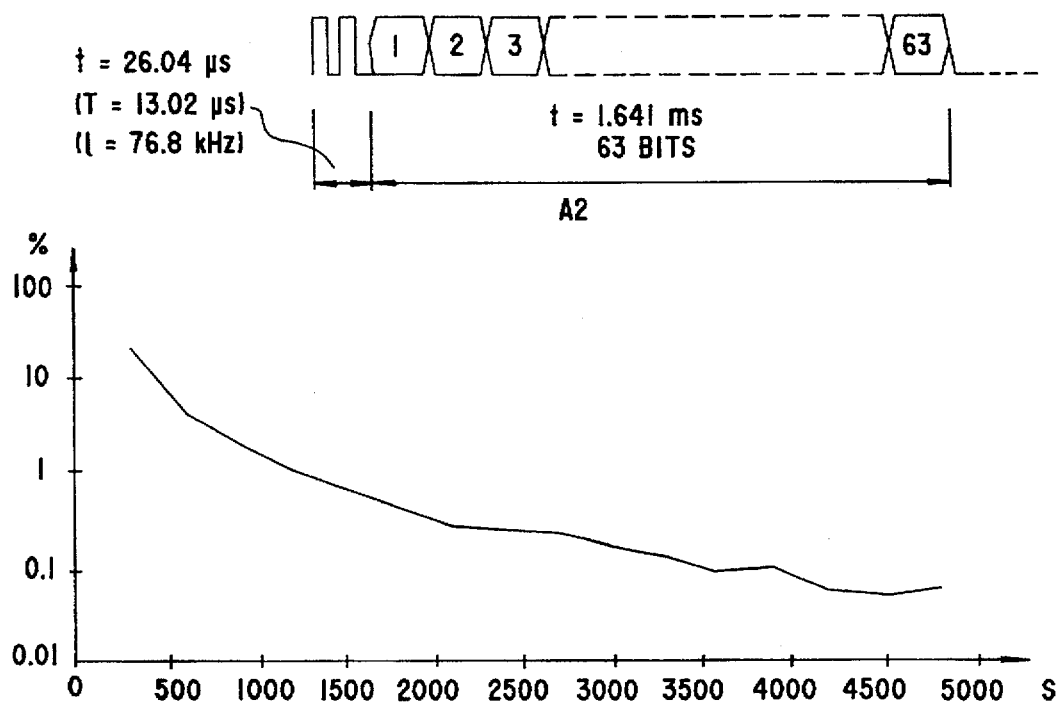

5,731,762

DATA MEDIUM FOR IDENTIFYING OBJECTS, SCANNING DEVICE FOR INTERROGATION OF THE DATA MEDIUM AND PROCESS FOR CONTROLLING THE DATA MEDIUM

CROSS-REFERENCE TO RELATED APPLICATION

This application is a Continuation of International Application Ser. No. PCT/EP94/04063, filed Dec. 6, 1994, published as WO95/16214, Jun. 15, 1995.

BACKGROUND OF THE INVENTION

FIELD OF THE INVENTION

The present invention relates to a data medium for identifying objects, in particular products, having a data source and an energy source. The invention also relates to a scanning device for interrogation of the data medium and a process for controlling the data medium.

Data media of the above-mentioned type are attached in particular to products to be transported, in order to be able to register them during the production procedure and their use. As a result, the production procedure and transportation or use of the products can be controlled.

An example of such products are gas cylinders, of which about 70 million are in use in Europe and over 100 million are in use in the USA. The cylinders are filled in filling plants, for example with oxygen for medical equipment and are thereupon transported to the consumers. The empty cylinders are transported back to the filling plants.

Since the gas cylinders are made from sheet steel, they can be kept in circulation for about ten years. However, due to different trips, different applications and different time sequences, losses of gas cylinders on the order of up to 3% of the total volume occur per year.

In order to reduce those losses, it is known to provide the gas cylinders with a data medium which bears an individual identification that can be contactlessly interrogated and thus serves to identify and keep track of the gas cylinders.

However, known data media with a battery-powered data transmitter have a relatively high energy consumption and are relatively expensive to manufacture due to their complex structure.

As an alternative thereto, it has therefore been proposed to construct data media with inductively powered data transmitters. However, those data transmitters only have low ranges, with the result that identification of the objects is possible only over small distances, whereby problems arise when the cylinders are transported, for example through the use of trucks.

SUMMARY OF THE INVENTION

It is accordingly an object of the invention to provide a data medium for identifying objects, a scanning device for interrogation of the data medium and a process for controlling the data medium, which overcome the hereinaforementioned disadvantages of the heretofore-known products, devices and methods of this general type and in which the data medium has only a low power consumption and a high interrogation range.

With the foregoing and other objects in view there is provided, in accordance with the invention, a data medium for identifying objects, in particular products, comprising a data source, an energy source, and at least one RF signal reflector having a characteristic frequency to be controlled by the data source.

The data medium according to the invention is distinguished by low energy consumption, since it does not contain any active transmitting element.

In accordance with another feature of the invention, the at least one signal reflector of the data medium is formed by a slot antenna. As a result, environmental influences are reduced to a minimum.

In accordance with a further feature of the invention, the slot antenna is made from a base of plastic provided with a metal layer, and the metal layer has a slot. As a result, simple and inexpensive manufacture is possible.

In accordance with an added feature of the invention, there is provided an impedance which can be controlled by the data source for controlling the characteristic frequency of the signal reflector. Consequently, movable parts are avoided and the fault susceptibility of the signal reflector is reduced.

In accordance with an additional feature of the invention, the slot antenna has two longitudinal borders, and the controllable impedance includes two variable capacitance diodes being inserted between the two longitudinal borders and being connected in series in high frequency terms and in parallel in low frequency terms. This is advantageous since it results in a particularly effective modulation of the characteristic frequency.

In accordance with yet another feature of the invention, the energy source is a battery, in particular a lithium battery.

In accordance with yet a further feature of the invention, the energy source is a photovoltaic element.

In accordance with yet an additional feature of the invention, the data medium is encapsulated in a plastics material which reduces the risk of mechanical damage and consequently increases reliability.

In accordance with again another feature of the invention, there is provided a plurality of signal reflectors curved in divided circle form and joined together to form a circular ring. In this way, the data medium can be fitted particularly simply onto the neck of a cylinder, in particular a gas cylinder.

With the objects of the invention view there is also provided, in accordance with the invention, a scanning device for interrogation of a data medium having a data source, an energy source, and at least one RF signal reflector with a characteristic frequency to be controlled by the data source, the scanning device comprising an RF transmitting device, an RF receiving device, and an evaluation circuit for interrogation of the data medium.

With the objects of the invention view there is additionally provided, in accordance with the invention, a process for controlling a data medium having a data source, an energy source, and at least one RF signal reflector antenna with a characteristic frequency to be controlled by the data source, which comprises periodically recurrently controlling the reflector antenna by the data source with a period corresponding to a predetermined period of time; subdividing the period of time into at least a first and a second interval; modulating the characteristic frequency of the reflector antenna by the data source in the first interval for permitting an individual identification to be interrogated by a scanning device; and providing no control of the characteristic frequency of the reflector antenna in the second interval.

The process according to the invention for controlling the data medium results in a further reduction in the energy consumption and, with simultaneous operation of a plurality of data media, in a low blocking rate and consequently a high probability of identification.

In accordance with another mode of the invention, the length of time of the second interval is a multiple of the length of time of the first interval.

In accordance with a further mode of the invention, the first interval has a synchronization signal and a check signal. Consequently, the circuitry of a scanning device can be kept simple and the risk of scanning errors can be reduced.

In accordance with an added mode of the invention, the individual identification of each data medium is stored as a digital code in the data source, and this code is converted into an orthogonal pulse sequence with which the characteristic frequency of the signal reflector is modulated. In this way, the rate of identification is further increased.

In accordance with a concomitant mode of the invention, the blocking rate can be reduced by the predetermined periods of time in a group of data sources being of different lengths, preferably in each case being an integral multiple of a predetermined time period, and by the periods of time being time-shifted in relation to one another, and/or if the use of timing elements with limited accuracy causes the predetermined periods of time to have different lengths.

Other features which are considered as characteristic for the invention are set forth in the appended claims.

Although the invention is illustrated and described herein as embodied in a data medium for identifying objects, a scanning device for interrogation of the data medium and a process for controlling the data medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is an exploded perspective view of a fitting of a data medium onto a gas cylinder;

FIG. 6 is a perspective view of a system for identifying gas cylinders;

FIG. 7 is a timing diagram of a frequency control of the reflector antenna of a data medium;

FIG. 8 is a timing diagram of a first time interval of the frequency control;

FIG. 9 is a supplement of the timing diagram according to FIG. 8; and

FIG. 10 is a diagram showing a probability of mutual disturbances over a scanning period of time.

DESCRIPTION OF THE PREFERRED EMBODIMENTS

Figure 1:
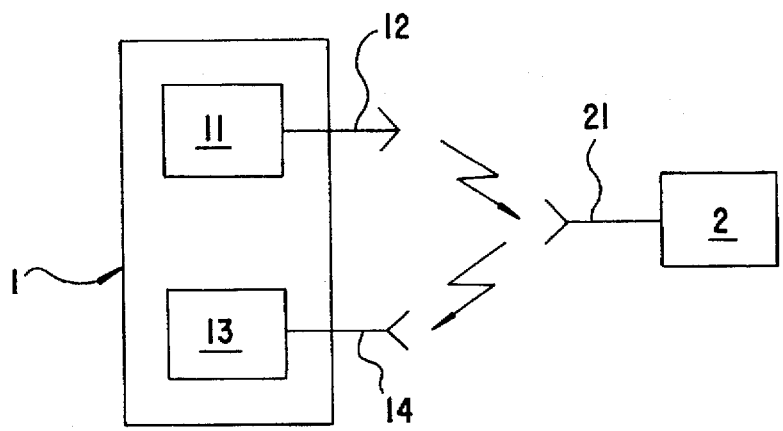
FIG. 1 is a block circuit diagram of a scanning device for a data medium according to the invention.

Referring now to the figures of the drawings in detail and first, particularly, to FIG. 1 thereof, there is seen a scanning device which includes a reading station 1, through the use of which a code impressed on a data medium 2 can be interrogated. The reading station 1 contains an RF transmitter 11, a transmitting antenna 12 connected to the latter, and a receiving station 13 with a receiving antenna 14. The data medium 2 has a reflector antenna 21.

In order to increase the dependability of identification, it may be expedient to equip the scanning device with a plurality of transmitting and receiving antennas 12, 14 and/or with a plurality of RF transmitters 11 and receiving stations 13 which may also operate at different frequencies, if appropriate.

The mode of operation of the scanning device is as follows: RF signals emitted from the reading station 1 through the transmitting antenna 12 pass to the data medium 2 and are absorbed by the latter whenever a frequency of the transmitted signal matches a characteristic frequency of the reflector antenna 21 of the data medium 2, whereas they are reflected whenever the frequencies do not match, as a function of the differences in the frequencies. Since the characteristic frequency of the reflector antenna 21 of the data medium is modulated in periodic time intervals by a pulse sequence corresponding to a digital code of the data medium 2, this results in an interrogation of the code and consequently of the individual identification of the relevant data medium 2, whereby the associated object can be identified.

Figure 2:
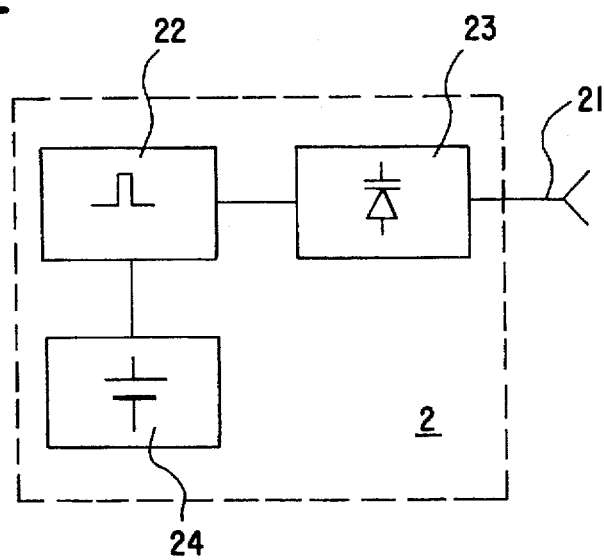
FIG. 2 is a block circuit diagram of the data medium.

The data medium 2, which is explained with reference to FIG. 2, contains the reflector antenna 21, a data source 22, a controllable impedance 23 and a battery as an energy source 24.

The energy source 24 may also be realized, for example, through the use of an inductively chargeable supply circuit, or through the use of a photovoltaic element.

The controllable impedance 23 is controlled by the data source 22, on which the individual identification of the relevant data medium is impressed and which is powered by the battery 24. A modulation of the characteristic frequency of the reflector antenna 21 then takes place by the controllable impedance 23 in such a way that the frequency either largely matches the frequency of the transmitted signal or deviates significantly from it. The individual identification of the data medium is represented by the variation over time of the characteristic frequency of the reflector antenna 21.

The reflector antenna 21 is constructed as a slot antenna, which is explained in more detail with reference to FIGS. 3a and 3b.

Figure 3A:
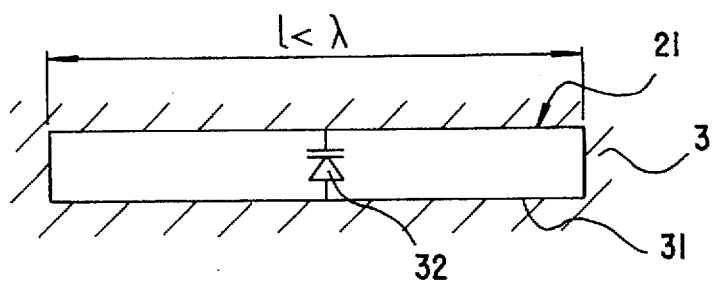
FIGS. 3a and 3b are diagrammatic, elevational views of reflector antennas.

The slot antenna according to FIG. 3a includes a metal sheet 3, which has a slot 31 having a length $l<\lambda$, wherein $\lambda$ represents the wavelength of the transmitted signal. Inserted between the two edges of the slot 31 is a variable capacitance diode 32, by which the electrically effective length of the slot 31, and consequently the characteristic frequency of the slot antenna 21 formed by the metal sheet 3, is varied as a function of the impressed voltage.

As an alternative to a single variable capacitance diode, the controllable impedance may also be constructed with two variable capacitance diodes which are connected in series in RF terms and in parallel in NF terms.

Figure 3B:
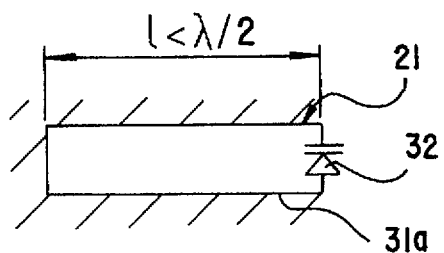

Represented in FIG. 3b is a structural variant of the slot antenna 21 in which a slot 31a extends only over half the length, and the controllable impedance, in particular a variable capacitance diode 32, is disposed at one end of the slot 31a.

This configuration also has the effect of varying the electrically effective length of the slot 31a as a function of the voltage across the variable capacitance diode or diodes.

Figure 4:
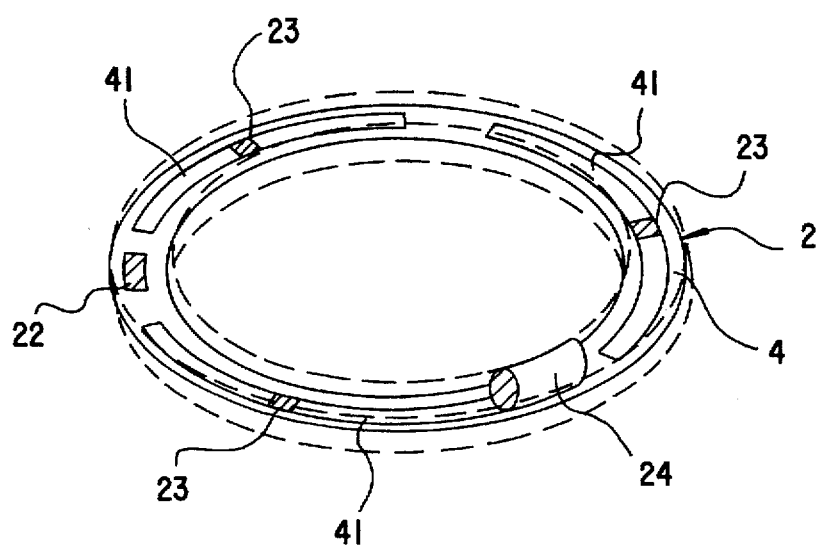
FIG. 4 is a perspective view of a data medium for gas cylinders.

The data medium 2 represented in FIG. 4 includes a ring 4 which is made of metal and has three slots 41 over its circumference, which form three reflector antennas. The data medium 2 further includes a data generator 22, which is powered by a battery 24 as an energy source and controls controllable impedances 23, that are inserted in the slots 41 and are connected to longitudinally running borders of the latter.

The controllable impedances 23 are constructed through the use of variable capacitance diodes and they modulate the characteristic frequency of the reflector antennas formed by the slots 41 in accordance with the voltage across them. As a result, the waveform of the characteristic frequency reproduces the individual identification of the data medium. This information is passed on to RF signals reflected by the antenna, since the reflection properties of the reflector antenna depend, as is known, on the degree of matching between the RF signal and the characteristic frequency of the antenna. By subjecting the reflector antenna to a transmitted RF signal and receiving the reflected RF signal, the individual identification of the data medium can consequently be interrogated over relatively large distances, with it being possible to keep the energy consumption in the data medium very low.

FIG. 5 shows a circular data medium 2 for gas cylinders 5, which is fastened on a neck of the gas cylinder 5. A configuration with three reflector antennas 41 has the effect of making the reflectivity substantially direction-independent, so that the data medium can be scanned from any direction and the position of the gas cylinder during the scanning is immaterial.

In the case of the present exemplary embodiment, the reflector antenna 4 is formed by a metal sheet which is provided with at least one slot 41. However, it may also be realized through the use of a conventional metallically coated printed board.

In order to increase the mechanical load-bearing strength, the reflector antenna, the data source, the battery and the controllable impedance may be encapsulated in a plastic material, while ensuring that this sleeve does not disturb the RF field to the extent that the functional capability of the data medium is put at risk. Alternatively, the data medium may also be provided with a conventional housing, preferably of nonconductive plastic.

If a plurality of data media are scanned simultaneously and consequently reflect simultaneously, superposing of the reflection signals may cause so-called blocking, i.e. no single reflection signal can be decoded. This may be the case, for example, with gas cylinders if a plurality thereof are transported simultaneously on trucks.

The process according to the invention for controlling the data media reduces this blocking probability.

As is represented in FIG. 7, the reflector antenna of a data source is frequency-modulated within a periodically recurring period of time by a control device disposed in the data source. This period of time is subdivided into two intervals A and B. The significantly shorter first interval A has a length of time of 1.771 ms, whereas the second interval B has a length of time of 106.67 ms to 213.34 ms. Within the first interval A, the reflector antenna is frequency-modulated, as a result of which the code which is impressed on the relevant data medium and represents the individual identification of the data medium can be scanned through the use of an assigned transmitting and receiving device. By contrast, no modulation of the reflector antenna takes place in the second interval B, as a result of which no data can be scanned.

A check signal at the end of the first interval A has the effect of increasing the dependability of identification. In this case, the part A has a length of time of 1.875 ms.

As is evident from FIG. 8, the first time interval A is subdivided into two subregions A1 with a length of 104.2 μs and A2 with a length of 1.667 ms. It is possible in the first subregion A1 to scan a control signal, whereas in the second subregion A2 the actual code of the relevant data medium can be scanned.

As already mentioned, in order to increase the dependability of identification, a third subregion having a length of 104.2 μs, for example, and containing a further control signal, may also be provided at the end of the interval A.

As is finally evident from FIG. 9, the second subregion A2 contains a synchronization signal at the beginning, which is formed by two pulses within 26.04 μs. This is followed by 63 signal blocks, which contain the relevant code of the data medium.

In the exemplary embodiment, the digital 0 values are thereby formed by two pulses with a length of 6.51 μs and the digital 1 values are formed by a single pulse with a length of 13.02 μs, in each case within a period of time of 26.04 μs.

In order to scan a group of data media a transmitting device is provided, from which a signal that can be reflected by the reflector antennas is transmitted. It is possible for the reflection signals to be registered through the use of a receiving device. The time intervals A, within which the reflector antennas of the individual data media are frequency-modulated, are significantly shorter than the time intervals B, within which no frequency modulation of the reflector antennas takes place.

In this case, timers or timing pulse generators for the control devices of the individual data media may be put into operation at different times. In addition, the second time intervals B of different data media are of different lengths. Finally, due to inaccuracies of the timers contained in the individual data media, the intervals A and B in different data sources are not entirely the same, but deviate more and more from one another in the course of time. Due to all of these factors, the probability of the time intervals A of two data media coinciding within one scanning period, whereby blocking can occur, is very low. Moreover, the probability of data media disturbing one another drops with the number of scanning periods over which a scanning operation extends.

The diagram according to FIG. 10 indicates in percentages the probability of disturbances caused by the simultaneous occurrence of two scanning signals over the length of the scanning period in the case of a group where the number of data media is twelve. This is based on the time intervals according to the exemplary embodiment shown in FIG. 7.

We claim:

1. A data medium for identifying objects, comprising a data source, an energy source, and at least one RF signal reflector having a characteristic frequency, said data source periodically recurrently controlling said signal reflector with a period corresponding to a predetermined period of time, whereby the period of time is divided into a first interval and a second interval, and said data source further modulating the characteristic frequency of said signal reflector in the first interval for permitting an individual identification be interrogated by a scanning device, while the characteristic frequency of said signal reflector is not controlled in the second interval.

2. The data medium according to claim 1, wherein said at least one signal reflector is a slot antenna.

3. The data medium according to claim 2, wherein said slot antenna includes a plastic base and a metal layer having a slot formed therein.

4. The data medium according to claim 1, including an impedance to be controlled by said data source for controlling the characteristic frequency of said signal reflector.

5. The data medium according to claim 2, including an impedance to be controlled by said data source for controlling the characteristic frequency of said signal reflector, said slot antenna having two longitudinal borders, and said controllable impedance including two variable capacitance diodes being inserted between said two longitudinal borders and being connected in series in high frequency terms and in parallel in low frequency terms.

6. The data medium according to claim 1, including a plurality of signal reflectors being curved in divided circle form and joined together to form a circular ring.

7. The data medium according to claim 1, wherein the objects are products.

8. In combination, a data medium and a scanning device for interrogation of the data medium, the data medium comprising: a data source, an energy source, and at least one RF signal reflector with a characteristic frequency, said data source periodically recurrently controlling said signal reflector with a period corresponding to a predetermined period of time, whereby the period of time is divided into a first interval and a second interval, and said data source further modulating the characteristic frequency of said signal reflector in the first interval for permitting an individual identification to be interrogated by a scanning device, while the characteristic frequency of said signal reflector is not controlled in the second interval; and the scanning device comprising an RF transmitting device, an RF receiving device and an evaluation circuit.

9. A process for controlling a data medium having a data source, an energy source, and at least one RF signal reflector antenna with a characteristic frequency to be controlled by the data source, which comprises:

periodically recurrently controlling the reflector antenna by the data source with a period corresponding to a predetermined period of time;

subdividing the period of time into at least a first and a second interval;

modulating the characteristic frequency of the reflector antenna by the data source in the first interval for permitting an individual identification to be interrogated by a scanning device; and providing no control of the characteristic frequency of the reflector antenna in the second interval.

10. The process according to claim 9, which comprises setting a length of time for the second interval at a multiple of a length of time for the first interval.

11. The process according to claim 9, which comprises marking a beginning of the first interval by a synchronization signal and marking an end of the first interval by a check signal.

12. The process according to claim 9, which comprises storing an individual identification of the data medium as a digital code in the data source, and converting the code into an orthogonal pulse sequence with which the characteristic frequency of the signal reflector is modulated.

13. The process according to claim 9, which comprises controlling a plurality of data media and assigning each data medium a predetermined period of time different from the predetermined periods of time assigned to the respectively other data media, and time-shifting the periods of time in relation to one another.

14. The process according to claim 13, which comprises setting the predetermined periods of time in a group of data sources to be of different-length integral multiples of a predetermined time period, and time-shifting the periods of time in relation to one another.

15. The process according to claim 9, which comprises controlling a plurality of data media and assigning each data medium a predetermined period of time and setting different lengths for the predetermined periods of time with timing elements having limited accuracy.

* * * * *